United States Patent
Sato

(10) Patent No.: US 6,973,408 B2
(45) Date of Patent: Dec. 6, 2005

(54) LSI TEST PROGRAM PROTECTION METHOD AND LSI TEST METHOD

(75) Inventor: Shinichiro Sato, Miyazaki (JP)

(73) Assignee: Oki Electric Industry Co., Ltd., Tokyo (JP)

(*) Notice: Subject to any disclaimer, the term of this patent is extended or adjusted under 35 U.S.C. 154(b) by 46 days.

(21) Appl. No.: 10/669,256

(22) Filed: Sep. 25, 2003

(65) Prior Publication Data

US 2004/0133883 A1 Jul. 8, 2004

(30) Foreign Application Priority Data

Jan. 8, 2003 (JP) .............................. 2003-002450

(51) Int. Cl.[7] .......................................... G01M 19/00
(52) U.S. Cl. .................... 702/123; 702/182; 714/25
(58) Field of Search ............................... 702/182, 123, 702/183, 184, 185; 714/1, 25, 32, 736, 739; 324/73.1; 370/241

(56) References Cited

U.S. PATENT DOCUMENTS 5,286,962 A * 2/1994 Fujioka et al. ............... 235/492
6,397,353 B1 * 5/2002 Orlidge et al. ................. 714/25
6,449,741 B1 * 9/2002 Organ et al. .................. 714/724
6,601,203 B1 * 7/2003 Asano et al. ................. 714/738
6,725,407 B2 * 4/2004 Richter et al. ............... 714/733

FOREIGN PATENT DOCUMENTS

| JP | 2001-052134 | 2/2001 |
| JP | 2001-306528 | 11/2001 |

* cited by examiner

Primary Examiner—Michael Nghiem
Assistant Examiner—Stephen J. Cherry
(74) Attorney, Agent, or Firm—Volentine Francos & Whitt, PLLC

(57) ABSTRACT

In a method for protecting a test program, a source file is translated using a primary key owned by a program provider to create a distribution file and a secondary key so that an object file of the test program can be created only when the distribution file and the secondary key are used. Further, in an LSI test method, a test pattern is created from a source file and a scramble format, to decide whether a signal, sent from an LSI, of response to the test pattern is right or wrong based on a test plan.

4 Claims, 3 Drawing Sheets

LSI TEST PROGRAM PROTECTION METHOD AND LSI TEST METHOD

BACKGROUND OF THE INVENTION

1. Field of the Invention

The present invention relates to an LSI test program protection method and an LSI test method for improving security in testing of an LSI to thereby prevent leakage of product technologies or un-authorized use of software or data stored in the LSI owing to deciphering of a test program (referred to as TP also).

2. Description of the Related Art

FIG. 1 is a block diagram for showing a configuration of a test system of a conventional general LSI tester, in which an object 3 obtained as a result of compiling a source program 1 using a compiler 2 is loaded to a memory in a tester/controller 4 or any other memory, to conduct measurement. The source program 1 is a file prepared in a text format and so can be referenced easily by a general-purpose editor 5. That is, the program can be rewritten un-authorizedly using the editor.

Conventionally, such an approach is available (see Jpn. Pat. Appln. KOKAI Publication No. 2001-306528), by which, in order to provide a content delivery method and system that can distribute contents safely by preventing un-authorized operations such as un-authorized copy of the contents beforehand and a recording medium for recording a content delivery program, information of a user is registered by user registration means so that, if the user wishes to utilize the present system, user authentication means can decide whether he is already registered and, if he is registered already, authorize him to retrieve desired contents by using content retrieval means and acquire a utilization right for the retrieved contents and also that operations of the user on the contents whose utilization right he has acquired can be monitored by content monitor means.

Further, such another approach is available (see Jpn. Pat. Appln. KOKAI Publication No. 2001-52134), by which, in order to provide an IC card system communication data protection processing method and apparatus for enabling distributing data safely by preventing tampering and un-authorized use of data transferred to the IC card in a decentralized environment including the IC card and a recording medium for recording a IC card system communication data protection processing program, a data division transmitted from an IC card terminal, a signature by use of a secret key of a person who secures the data division, and a public key that corresponds to the secret key used in the signature are certified, wherein at least an identifier of an owner of the public key, a public key of a signer of the data division, and an identifier and a signature of an authentication organization that secures information of at least these identifier and public key are used and, further, the public key is extracted from a certificate based on a validity period contained in the certificate, so that based on the public key thus extracted, signature verification processing is performed.

A test program, which is written in a program language specific to a test system, can be deciphered by a technician well acquainted with the program language, who can then analyze test contents easily. To use the Operating System (OS) and the compiler of a tester, on the other hand, it is necessary to combine their maker-recommended version numbers. Therefore, in some cases, to entrust testing to an external test house, a source program is provided to the test house so that they may compile the source program to avoid a trouble due to a mismatch in version number with the OS.

Even in a case where the version numbers are specified and only an object as compiled is provided, an original source file can be restored by using a tool, if available, which inversely translates the object and also, contents can be analyzed by monitoring a test signal. That is, there is no way but to rely on a contract of a legal obligation to keep secrets in a present situation where it is very difficult to distribute a test program to entrust testing to an external test house while protecting secret matter contained in the test program and unique measurement technologies.

SUMMARY OF THE INVENTION

It is an object of the present invention to provide a test program protection method for enabling distributing a test program safely without relying on a legal obligation to keep secrets and an LSI test method that makes it difficult for a third party to analyze data.

The program protection method of the present invention comprises the steps of:

translating a source file in which an LSI test program is stored, using a primary key owned by a program provider to thereby create a distribution file and a secondary key; and authorizing creation of an object file of the test program only when the distribution file and the secondary key are used.

By such a method, source information of the test program can be translated into an object code only by using the secondary key and the distribution file that have been created using the primary key owned by the program provider, thereby distributing the test program safely.

Further, the LSI test method of the present invention comprises the steps of:

providing a compiler for receiving a source file in which an LSI test program is stored and a scramble format specific to an LSI, to output an enciphered LSI test pattern and a decoder provided in the LSI;

when a test-subject LSI is set in a test mode, inputting via a test head the enciphered test pattern into the LSI; and deciphering the enciphered test pattern and providing the deciphered test pattern to an LSI core, to decide whether a signal, sent from the LSI, of response to the test pattern is right or wrong based on a test plan.

By such a method, it becomes extremely difficult for a third party to decipher data even if he monitors a terminal of the test head.

DESCRIPTION OF THE PREFERRED EMBODIMENTS

The following will describe embodiments of the present invention with reference to drawings.

First Embodiment

Figure 1:
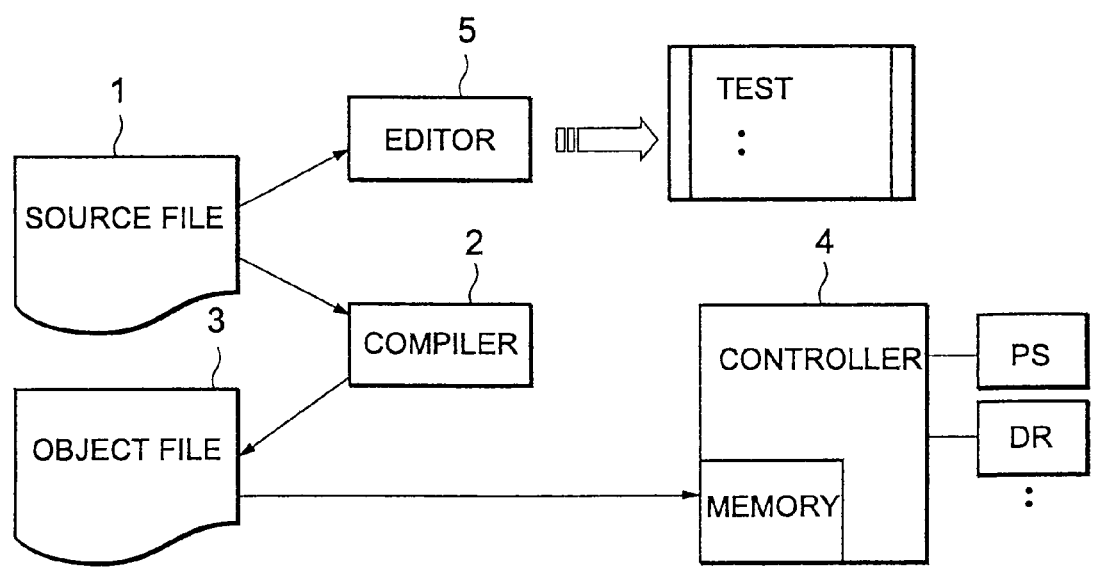
FIG. 1 is a block diagram for showing a conventional test system.
Figure 2:
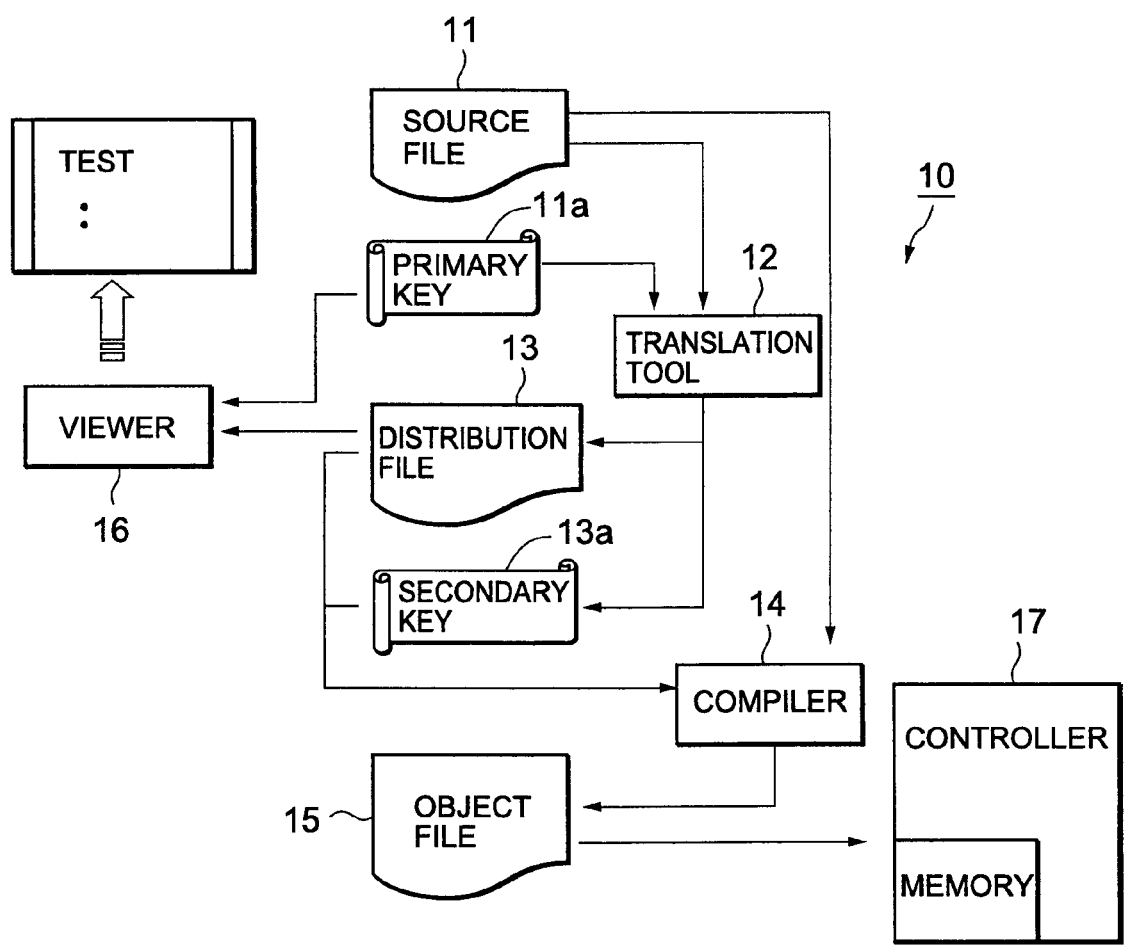
FIG. 2 is a block diagram for showing a system according to a first embodiment of the present invention.

FIG. 2 is a block diagram of a system according to the first embodiment of the present invention, which system 10 comprises:

a source file 11 in which a test program is stored;

a translation tool 12 for receiving a primary key 11a and the source file 11 to output a distribution film 13 and a secondary key 13a;

a compiler 14 for compiling contents of the distribution file 13 by using the distribution file 13 and the secondary key 13a;

a test controller 17 for receiving an object file 15, which is a compilation result created by the compiler 14, to execute it; and a Viewer 16 that can receive the primary key 11a and the distribution file 13 to output a text representation and a text file.

By this configuration, the source file 11 is translated together with the primary key 11a by the translation tool 12 to create the distribution file 13 and the secondary key 13a. It is to be noted that the primary key can be created from a password, a text file owned by a test program distributor, a binary file, information obtained from a magnetic card, an IC card, etc., or a combination of these.

Further, the distribution file 13 created by using the primary key can be translated into an object code by the compiler only by using the secondary key. Further, contents of the distribution file 13 can be displayed, edited, and translated into a source file only by using the primary key 11a and the dedicated Viewer 16, so that in order to avoid publicizing source information of a program, only the secondary key 13a and the distribution file 13 are provided.

The compiler 14 creates the object file 15 by using the distribution file 13 and the secondary key 13a. In this case, the compiler 14 can differentiate the source file 11 and the distribution file 13 from each other using a file extension and so can translate the source file 11 directly to thereby create an object file.

As described above, in the first embodiment, by distributing a TP using the distribution file 13 and the secondary key 13a, it is possible to prevent a trouble from occurring on the test program owing to a mismatch in version between the OS and the compiler and also to prevent the TP from being analyzed easily by a third party who uses a general-purpose editor. Further, by providing the secondary key 13a with a compilation restriction function by use of a license, it is possible to prevent, for example, un-authorized copy of the distribution file.

Second Embodiment

Figure 3:
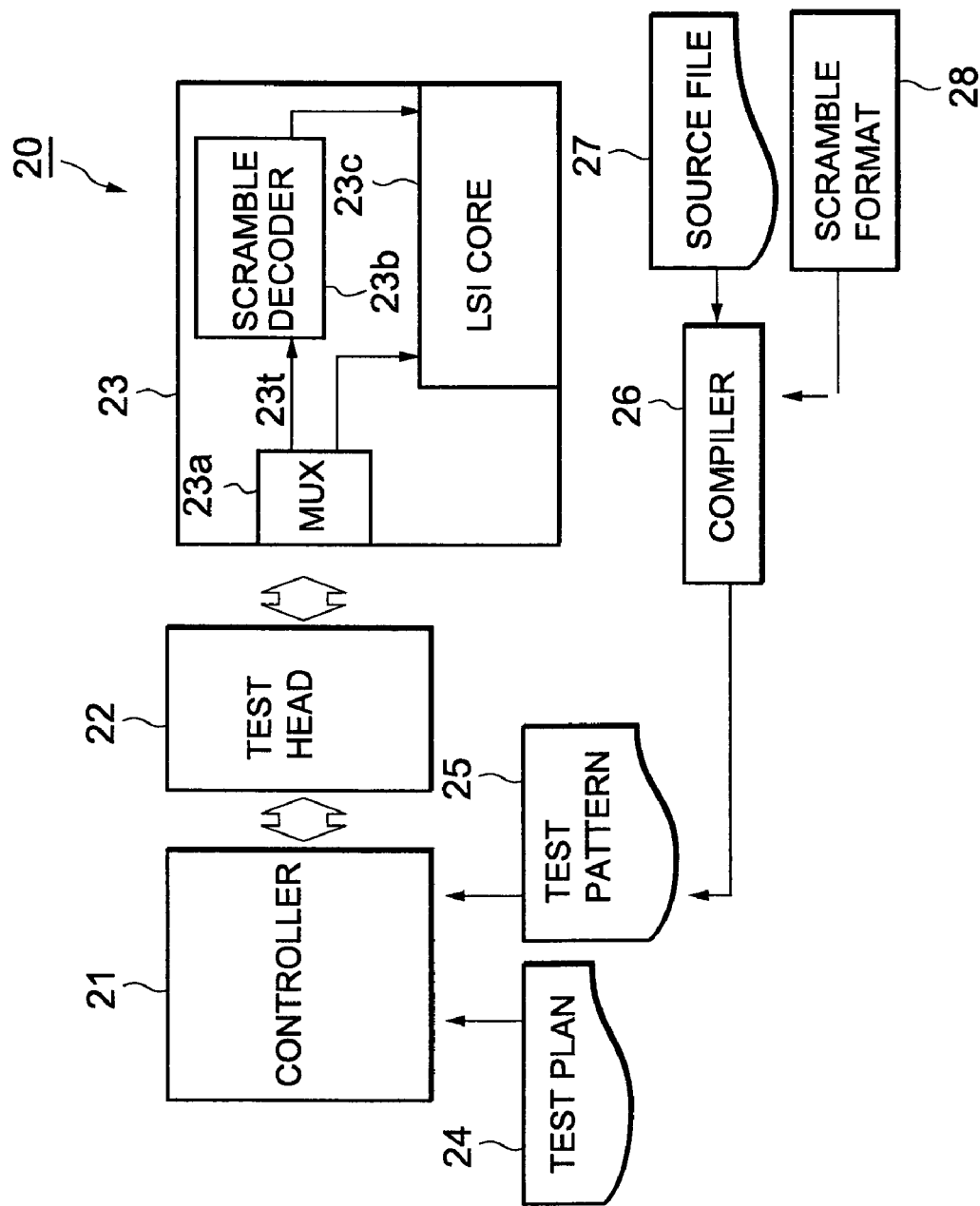
FIG. 3 is a block diagram for showing a system according to a second embodiment of the present invention.

FIG. 3 is a block diagram of a system according to the second embodiment of the present invention, which system 20 comprises:

a compiler 26 for receiving a source file 27 in which a test program is stored and a product LSI-specific scramble format 28 in which scramble information is stored, to create a test pattern 25 used to test an LSI23;

a measurement system for supplying a test head 22 with the test pattern 25 under the control of a controller 21 in accordance with a test plan 24 comprising a test item, a test condition, a test flow, PASS/FAIL decision processing, etc. to thereby monitor a measurement signal sent from the test head 22; and an LSI23 for inputting the test pattern 25 from a multiplexer 23a via a Scramble Decoder (23b) to an LSI Core (23c).

In the system 20 having this configuration, the source file 27 of the test pattern 25 is created when translated by the compiler 26 in accordance with the scramble format 28 specific to the product LSI. In this case, the LSI-specific scramble format refers to a format for instructing to prepare an LSI-specific recomposing rule and use it in order to recompose an array sequence of a test pattern that is already arrayed time series-wise for example.

The controller 21 performs processing on a signal input or output through the test head in accordance with the test plan 24 and the test pattern 25 as scrambled and also decides a test result. Specifically, it sends the test pattern 25 via the test head 22 to the LSI23 to be tested, to receive a response signal from the LSI23 via the test head 22, thus deciding whether the test result is right or wrong in accordance with contents of the test plan 24.

The LSI23 is provided with the Scramble Decoder (23b) for deciphering the scrambled test pattern input via the test head 22 to send a signal obtained as a result of decoding to the LSI Core (23c), so that it can be utilized via a multiplexer 23a when the test mode is selected, in construction.

As described above, according to the second embodiment, a signal to be output from the test head is enciphered beforehand in accordance with scramble information specific to a product LSI, so that it is extremely difficult for a third party to decipher data even if he monitors the signal as output from the test head.

What is claimed is:

1. A test program protection method comprising:

translating a source file in which an LSI test program is stored by using a primary key owned by a program provider to thereby create a distribution file and a secondary key; and authorizing creation of an object file of the LSI test program only when the distribution file and the secondary key are used, wherein restriction regarding a number of times of compilations is put on the secondary key.

2. A test program protection method comprising:

translating a source file in which an LSI test program is stored by using a primary key owned by a program provider to thereby create a distribution file and a secondary key; and authorizing creation of an object file of the LSI test program only when the distribution file and the secondary key are used, wherein the secondary key is provided with a compilation restriction function by use of a license.

3. An LSI test method comprising the steps of:

providing a compiler that receives a source file in which an LSI test program is stored and a scramble format specific to an LSI to output an enciphered test pattern for the LSI;

when the test-subject LSI is set in a test mode, inputting via a test head the enciphered test pattern into the LSI providing a decoder, in the LSI, which deciphers the enciphered test pattern, to provide the deciphered test pattern to an LSI core; and deciding whether a signal, sent from the LSI, of response to the test pattern is right or wrong based on a test plan.

4. The LSI test method according to claim 3, wherein the scramble format is used to recompose an array sequence of the test pattern which is already arrayed time series-wise, by using a specific recomposing rule prepared for each of the LSIs.

* * * * *